(12) United States Patent
Hirata et al.

(10) Patent No.: US 8,104,272 B2
(45) Date of Patent: Jan. 31, 2012

(54) EXHAUST PURIFYING SYSTEM FOR INTERNAL COMBUSTION ENGINE

(75) Inventors: Hirohito Hirata, Shizuoka-ken (JP); Masaru Kakinohana, Susono (JP); Masaya Ibe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 904 days.

(21) Appl. No.: 12/093,120

(22) PCT Filed: Oct. 27, 2006

(86) PCT No.: PCT/JP2006/322045
§ 371 (c)(1), (2), (4) Date: May 8, 2008

(87) PCT Pub. No.: WO2007/055160
PCT Pub. Date: May 18, 2007

(65) Prior Publication Data
US 2009/0120074 A1   May 14, 2009

(30) Foreign Application Priority Data

Nov. 9, 2005 (JP) ................ 2005-325020
Apr. 26, 2006 (JP) ................ 2006-122444

(51) Int. Cl.
*F01N 3/00* (2006.01)
(52) U.S. Cl. ............ 60/297; 60/275; 60/286; 60/289; 60/293; 60/295
(58) Field of Classification Search .......... 60/275, 60/276, 286, 287, 288, 289, 293, 295, 297
See application file for complete search history.

(56) References Cited

U.S. PATENT DOCUMENTS 6,557,340 B1 * 5/2003 Twigg et al. ............ 60/275
(Continued)

FOREIGN PATENT DOCUMENTS

DE          19904068      * 8/2000 ............ 60/286
(Continued)

OTHER PUBLICATIONS

Extended European Search Report dated Dec. 30, 2009 for EP Appl. No. 06822963.2.

*Primary Examiner* — Binh Q. Tran
(74) *Attorney, Agent, or Firm* — Finnegan, Henderson, Farabow, Garrett & Dunner, LLP

(57) ABSTRACT

There is provided an exhaust purifying system for an internal combustion engine which can achieve a function of a catalyst without deteriorating a function of ozone at the time of oxidizing and removing PM by using the ozone. The exhaust purifying system for the internal combustion engine comprises a wall-flow type particulate filter (30) for collecting particulate matter in an exhaust gas inside an exhaust passage, wherein the catalyst (38) is supported only in a part of a partition wall (37) of the particulate filter defining a passage (36) on the downstream side of the partition wall (37). In consequence, when ozone is supplied, since the ozone is introduced on the upstream side of the partition wall (37) in which the PM is collected, the ozone does not contact the catalyst supported only in the part of the partition wall defining the passage (36) on the downstream side of the partition wall. Therefore, it is prevented that the ozone is decomposed, and a PM oxidation function is achieved.

9 Claims, 14 Drawing Sheets

U.S. PATENT DOCUMENTS

| | | | |
|---|---|---|---|
| 6,912,841 B2 * | 7/2005 | Pfendtner et al. | 60/275 |
| 7,121,079 B2 * | 10/2006 | Calvo et al. | 60/275 |
| 2003/0115859 A1 | 6/2003 | Deeba | |
| 2004/0188238 A1 | 9/2004 | Hemingway et al. | |
| 2006/0162297 A1 * | 7/2006 | Hartherz | 55/282.3 |

FOREIGN PATENT DOCUMENTS

| | | |
|---|---|---|
| EP | E 0 277 012 | 8/1988 |
| EP | E 0 731 256 | 9/1996 |
| JP | 57-30524 | 2/1982 |
| JP | 2001-207836 | 8/2001 |
| JP | 2002-276337 | 9/2002 |
| JP | 2002-361344 | 12/2002 |
| JP | 2003-154223 | 5/2003 |
| JP | 2003-222014 | 8/2003 |
| JP | 2004-92584 | 3/2004 |
| JP | 2004-360637 | 12/2004 |
| JP | 2005-502823 | 1/2005 |
| WO | WO 02/085482 | 10/2002 |
| WO | WO 03/026778 | 4/2003 |

* cited by examiner

EXHAUST PURIFYING SYSTEM FOR INTERNAL COMBUSTION ENGINE

TECHNICAL FIELD

The present invention relates to an exhaust purifying system for an internal combustion engine and in particular, to an exhaust purifying system for an internal combustion engine which has a wall-flow type particulate filter for collecting and oxidizing particulate matter in an exhaust gas emitted from a diesel engine or a lean-burn gasoline engine to purify the particulate matter.

BACKGROUND ART

It is generally known that an exhaust gas in a diesel engine or a lean-burn gasoline engine contains NOx or particulate matter (hereinafter, referred to as PM) including carbon as a major constituent, which is a cause of air contamination. Therefore, various systems and methods have been proposed for trapping and removing the PM from the exhaust gas.

Among the systems and methods for reducing PM, it is generally known to dispose a diesel particulate filter (hereinafter, referred to as DPF) in an exhaust passage for collecting PM with this DPF. In addition, for oxidizing and removing the collected PM, there is proposed a so-called catalytic DPF of supporting catalysts with DPF (for example, Japanese Patent Laid-Open No. 2001-207836, Japanese Patent Laid-Open No. 2003-154223, Japanese Patent Laid-Open No. 2004-92584, etc.).

The technology described in Japanese Patent Laid-Open No. 2001-207836 does not uniformly distribute catalysts in the entirety of DPF but distributes more catalysts on the upstream side of the exhaust gas flow in DPF than on the downstream side, and also distributes more catalysts at the inflow side of the exhaust gas than at the outflow side in a partition wall, thus supporting the catalysts.

In addition, the technology described in Japanese Patent Laid-Open No. 2003-154223 shows a wall-flow type particulate filter in which a predetermined amount of catalysts are supported on one end side and the catalysts are supported to reduce in amount from the one end side toward the other.

Further, the technology described in Japanese Patent Laid-Open No. 2004-92584 likewise shows a wall-flow type particulate filter in which alkali metallic catalysts which do not contain noble metals are supported on the upstream side of a collection wall and also absorption NOx catalysts are supported on the downstream side of the collection wall.

In addition, it was recently disclosed the technique of oxidizing and treating PM by using ozone $O_3$ having a stronger oxidation effect as compared to $NO_2$ (for example, Japanese Patent Laid-Open No. 2005-502823). In a method and a system for performing post-treatment of an exhaust gas in a diesel engine described in Japanese patent laid-Open No. 2005-502823, a device for generating ozone $O_3$ or nitrogen dioxide $NO_2$ as an oxidant from the exhaust gas by plasma is disposed on the upstream side from a particulate filter and is designed to oxidize and remove soot collected in the particulate filter by selectively using the ozone and the nitrogen dioxide at a low temperature and the nitrogen dioxide at a high temperature in response to a temperature of the exhaust gas.

DISCLOSURE OF THE INVENTION

A method of using the catalytic DPF described in Japanese Patent Laid-Open No. 2001-207836 or Japanese Patent Laid-Open No. 2004-92584 has a problem because PM contained in the exhaust gas and the catalyst supported in DPF both are solid substances, both are not sufficiently contacted. As a result, an insufficient oxidative reaction of the PM occurs.

Therefore, it is considered that ozone $(O_3)$ having a stronger oxidation effect as compared to $NO_2$ or the like is used to such a catalytic DPF described in Japanese Patent Laid-Open No. 2005-502823, thus improving oxidation removal capabilities on PM. However, when the ozone having a strong oxidation effect is simply supplied to the aforementioned catalytic DPF, the ozone which has contacted the catalyst may be immediately decomposed according to the property of ozone, in other words, may be consumed. An amount of the ozone usable for oxidation and removal of PM is reduced. Therefore, an oxidation speed of PM is reduced and as a result, a sufficient purification efficiency can not be obtained.

Accordingly, an object of the present invention is to solve the foregoing problems and provide an exhaust purifying system for an internal combustion engine which can achieve a function of a catalyst without deteriorating a function of ozone at the time of oxidizing and removing PM by using the ozone.

An exhaust purifying system for an internal combustion engine according to the present invention for achieving the object comprises a wall-flow type particulate filter for collecting particulate matter in an exhaust gas inside an exhaust passage, wherein a catalyst is supported only in a part of a partition wall of the particulate filter defining a passage on the downstream side in the partition wall.

According to the exhaust purifying system for an internal combustion engine, particulate matter (PM) in the exhaust gas is collected on the upstream side of the partition wall in the wall-flow type particulate filter. Here, when ozone is supplied, since the ozone is first introduced on the upstream side of the partition wall in which the PM is collected, the ozone does not immediately contact the catalyst supported only in the part of the partition wall defining the passage on the downstream side of the exhaust gas in the partition wall. In consequence, it is prevented that the ozone is decomposed and consumed by the catalyst, enabling more ozone to be used for oxidation and removal of the PM in the particulate filter. This allows an efficient use of ozone and an improvement on a purification efficiency of PM by ozone.

Here, the catalyst may be a NOx catalyst for purifying NOx in the exhaust gas.

According to this embodiment, the NOx catalyst which does not effectively function normally at a low exhaust gas temperature or a low catalyst floor temperature, when ozone is supplied, rises in temperature by oxidation of PM on the upstream side passage of passages provided in such a manner as to sandwich the partition wall and therefore, is more activated. Thereby, NOx purification by the NOx catalyst can be promoted. In consequence, even at a low temperature to the extent the NOx catalyst does not effectively function, it is prevented that NOx is emitted without being treated by the NOx catalyst.

Further, the catalyst may be an ozone decomposition catalyst for decomposing ozone.

According to this embodiment, when the ozone is supplied, even if extra ozone passing through the partition wall without reaction to PM collected on the upstream side of the partition wall exists, the extra ozone is decomposed by the ozone decomposition catalyst, therefore preventing erosion of an exhaust pipe or a muffler disposed downstream of the DPF.

Further, the catalyst may be a CO oxidation catalyst for purifying CO in the exhaust gas.

According to this embodiment, when ozone is supplied, since the ozone does not immediately contact the CO oxidation catalyst supported only on the downstream side of the exhaust gas in the partition wall. It is prevented that the ozone is decomposed and consumed by the catalyst, and more ozone can be effectively used for oxidation and removal of PM in the particulate filter. In addition, CO generated due to the oxidation of the PM can be oxidized and removed by the CO oxidation catalyst.

It should be noted that an ozone supply means, which is capable of supplying ozone, is preferably disposed on the upstream side from the particulate filter.

According to this embodiment, the function and effect of each embodiment described above can be sufficiently achieved.

According to the present invention, upon oxidizing and removing PM by the catalytic DPF using ozone, an excellent effect of being capable of preventing unnecessary decomposition of ozone to efficiently use the ozone can be achieved.

BEST MODE OF CARRYING OUT THE INVENTION

Hereinafter, embodiments of the present invention will be explained with reference to the accompanying drawings.

Figure 1:
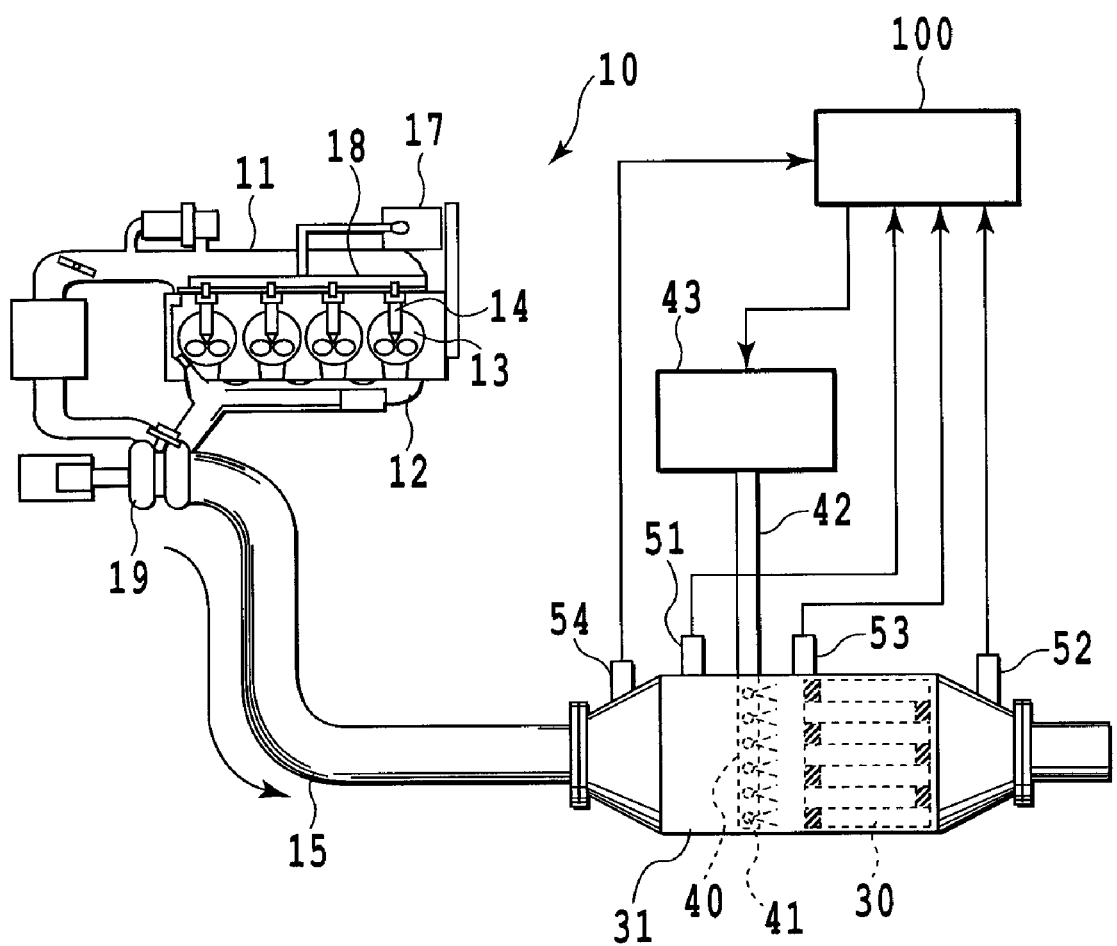
FIG. 1 is a system diagram schematically showing an exhaust purifying system for an internal combustion engine in an embodiment of the present invention.

FIG. 1 is a system diagram schematically showing an exhaust purifying system for an internal combustion engine according to an embodiment of the present invention. In the figure, numeral 10 denotes a compression ignition type internal combustion engine, i.e., diesel engine, numeral 11 denotes an intake manifold communicated to an intake port, numeral 12 denotes an exhaust manifold communicated to an exhaust port and numeral 13 denotes a combustion chamber. In the present embodiment, fuel supplied to a high-pressure pump 17 from a fuel tank (not shown) is supplied under pressure to a common rail 18 by the high-pressure pump 17 and accumulated therein in a high-pressure state and the high-pressure fuel in the common rail 18 is directly injected and supplied into the combustion chamber 13 from a fuel injection valve 14. Exhaust gas from the diesel engine 10 flows from the exhaust manifold 12 to a turbocharger 19 and thereafter, flows into an exhaust passage 15 on the downstream side therefrom. Further the exhaust gas is subject to the purification treatment as described later, and is discharged into the air. It should be noted that an example of the diesel engine is not limited to the engine equipped with such a common rail type fuel injection device. Further, another exhaust purifying device such as an EGR device may be arbitrarily included.

The exhaust passage 15 is provided with a diesel particulate filter (DPF) 30 disposed therein as a particulate filter for collecting particulate matter (PM) in the exhaust gas.

In addition, an ozone supplying nozzle 40 as the ozone supplying means, which is capable of supplying ozone ($O_3$) to DPF 30, is disposed on the upstream side from DPF 30. An ozone generator 43 is connected to the ozone supplying nozzle 40 as ozone generating means and ozone generated in the ozone generator 43 is supplied through an ozone supply passage 42 to the ozone supplying nozzle 40 and also is injected and supplied toward DPF 30 on the downstream side from the ozone supplying nozzle 40.

DPF 30 is supported by a support member (not shown) inside a metallic casing 31 made of substantially cylindrical stainless steel both ends of which are formed in a flat-head conical shape. The support member has insulation properties, heat resistance, buffer properties and the like and is made of an alumina mat, for example.

Figure 2:
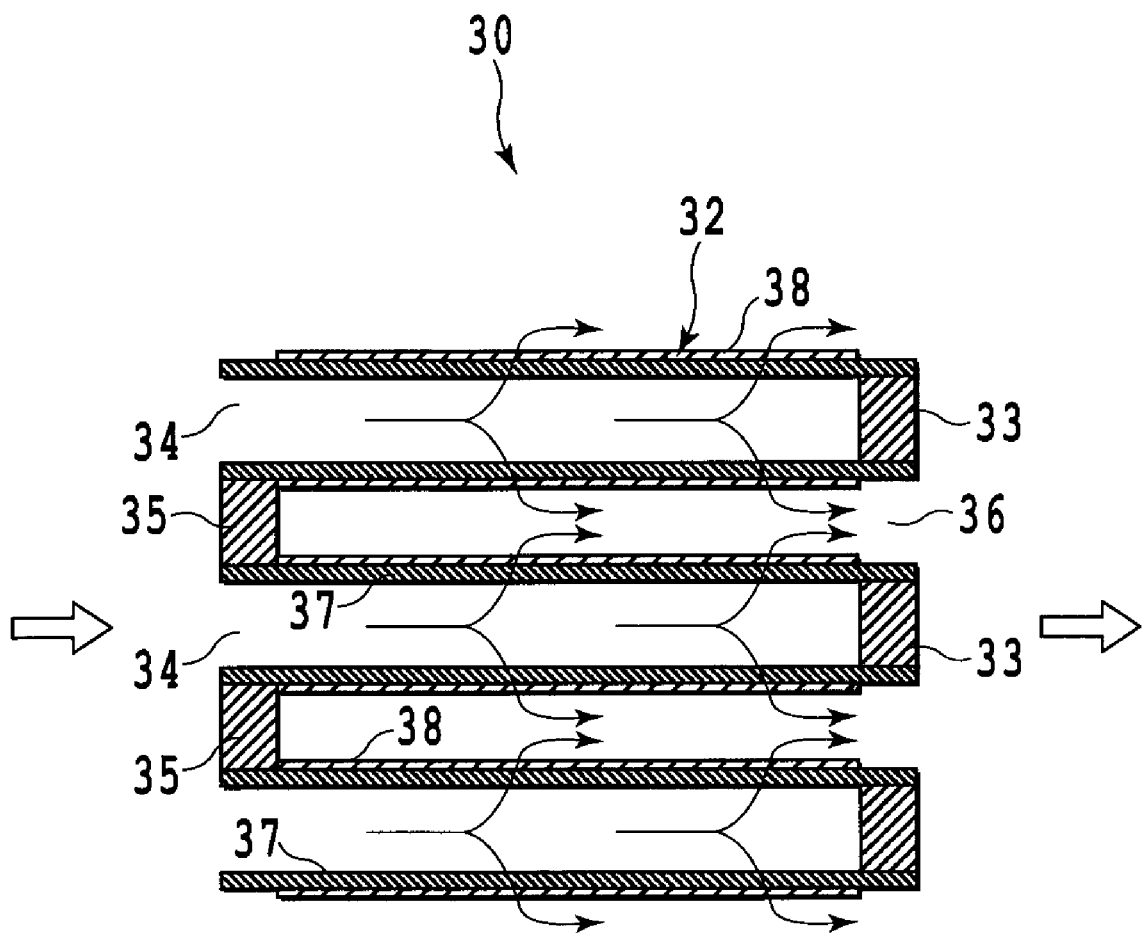
FIG. 2 is a cross section showing a wall-flow type honeycomb structure of DPF.

As shown in FIG. 2, DPF 30 is equipped with a honeycomb structure 32 made of a porous ceramic, and is of a so-called wall-flow type. The honeycomb structure 32 is formed by a ceramic material such as cordierite, silica, and alumina. The exhaust gas flows from the left to the right in the figure as shown in arrows. The honeycomb structure 32 includes first passages 34 and second passages 36 defined alternately therein by porous partition walls 37 to form a honeycomb shape, the first passage 34 being provided with a filling plug 35 at the upstream end thereof and the second passage 36 being provided with a filling plug 35 at the downstream end thereof. Each of the passage 34 and 36 is also called a cell and is in parallel to the flow direction of the exhaust gas. When the exhaust gas flows from the left to the right in the figure, the exhaust gas passes from the first passage 34 through the partition wall 37 of a porous ceramic, enters into the second passage 36, and flows to the downstream side. At this point, PM in the exhaust gas is collected by the partition wall 37 of the porous ceramic to prevent release of the PM into the air. A filter form in which the exhaust gas thus passes the partition wall 37 and the PM is filtered for collection at this point is called a wall-flow type.

In addition, in this embodiment, as shown in detail in FIG. 2, a catalyst 38 is coated or carried on the downstream side of the exhaust gas with respect to the partition wall 37 of the DPF 30, that is, only in a part of the partition wall 37 defining the second passage 36. In other words, no catalyst is disposed in a part of the partition wall 37 defining the first passage 34 on the upstream side of the partition wall 37 and the catalyst 38 is coated or supported only in the part of the partition wall 37 defining the second passage 36 on the downstream side of the partition wall 37. Since a filter part on the ozone supply side and a filter part on which the catalyst 38 is coated exist neighbored to each other across the partition wall 37, the filter part on which the catalyst is coated is in a heat retained state. Therefore, as described later, only ozone is supplied at a low temperature, and warming-up is not required particularly.

An example of the ozone generator 43 may include a generator for generating ozone while flowing dried air or oxygen as a raw material in a discharge tube to which a high voltage can be applied or of another arbitrary form. Here, the dried air or oxygen as a raw material, different from that in Japanese Patent Laid-Open No. 2005-502823, is a gas taken in from an outside of the exhaust passage 15, for example, a gas contained in ambient air and is not a gas contained in the exhaust gas as in the case of Japanese Patent Laid-Open No. 2005-502823. In the ozone generator 43, a generation efficiency of ozone is higher in a case of using a raw material gas at a low temperature than in a case of using a raw material gas at a high temperature. Accordingly, by thus using the gas outside of the exhaust passage 15, it is possible to improve the generation efficiency of ozone as compared to the case of Japanese Patent Laid-Open No. 2005-502823. It should be noted that the air or oxygen used herein is preferably dried, but is not limited to the dried state thereof.

The ozone supplying nozzle 40 is, as described in detail later, disposed at a position directly upstream of DPF 30 and supplies the ozone toward DPF 30 therefrom so that the ozone supplied from the ozone supplying nozzle 40 is not wastefully consumed by reaction with NOx or unburned constituents (CO, HC and the like) in the exhaust gas. In addition, the ozone supplying nozzle 40 has a plurality of ozone supply ports 41 as wide as to cover an entire diameter of the upstream end surface of DPF 30 in such a manner as to be capable of uniformly supplying ozone over the entirety of the upstream end surface of DPF 30. The ozone supplying nozzle 40 extends in the diameter direction of the casing 31 and is fixed to the casing 31. It should be noted that the form of the ozone supplying means may include various forms other than such an ozone supplying nozzle 40 and, for example, in a case where the ozone supplying nozzle 40 has only one ozone supply port, preferably the one ozone supplying port is opened to be positioned on a center axis of DPF 30 and also a distance between the ozone supplying port and the upstream end surface of the DPF is provided in such a manner that the ozone can spread uniformly over the entire upstream end surface of the DPF.

Here, in one form of the present embodiment, the catalyst 38 is a NOx catalyst and is formed preferably of either one of an absorption reduction type NOx catalyst (NSR: NOx Storage Reduction) and a selective reduction type NOx catalyst (SCR: Selective catalytic Reduction).

In the case of using the absorption reduction type NOx catalyst, a noble metal such as platinum Pt as a catalyst constituent and a NOx absorption constituent are supported on a substrate surface made of an oxidant such as alumina $Al_2O_3$, which is the partition wall 37. The NOx absorption constituent consists of at least one selected out of, for example, an alkali metal such as kalium K, natrium Na, lithium Li or cesium Cs, an alkaline earth such as barium Ba or calcium Ca and a rare earth such as lanthanum La or yttrium Y.

The absorption reduction type NOx catalyst performs an absorption/release function of absorbing NOx when an air-fuel ratio of an exhaust gas flowing into the catalyst is leaner than a predetermined value (typically, stoichiometric air-fuel ratio) and releasing the absorbed NOx when an oxygen density in the exhaust gas flowing into the catalyst is reduced. Since in the present embodiment, a diesel engine is used, an exhaust air-fuel ratio is usually lean and the NOx catalyst absorbs NOx in the exhaust gas. In addition, when a reducer is supplied on the upstream side from the NOx catalyst to enrich the air-fuel ratio of the exhaust gas flowing thereto, the NOx catalyst releases the absorbed NOx. This released NOx reacts with the reducer to be reduced and purified.

Figure 3A:
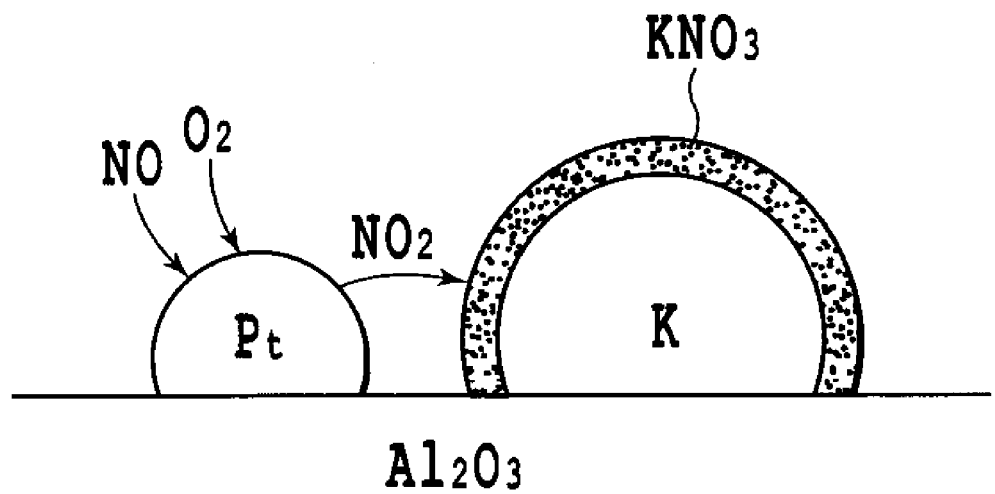
FIGS. 3A and 3B are schematic diagrams for explaining a mechanism of absorption and release of NOx in an absorption reduction type NOx catalyst.
Figure 3B:
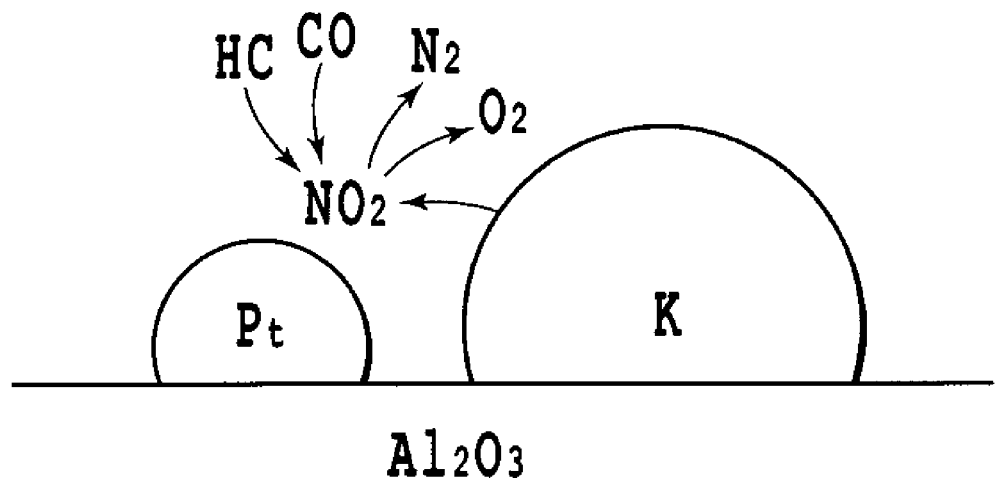

It is considered that absorption/release and reduction/purification of the NOx are performed based upon the following mechanism as shown in FIGS. 3A and 3B. This mechanism will be explained with reference to an example of an absorption reduction type NOx catalyst in which platinum Pt and kalium K are supported on a substrate surface formed of alumina $Al_2O_3$. It should be noted that even in a case of using another noble metal, an alkali metal, an alkaline earth or a rare earth, the same mechanism is to be applied.

First, as shown in FIG. 3A, when an inflow exhaust gas becomes lean, the oxygen density and the NOx density in the exhaust gas increase and the oxygen $O_2$ adheres on the surface of platinum Pt in the form of $O_2^-$, $O^{2-}$, O atom and the like. On the other hand, NO in the inflow exhaust gas reacts with $O_2^-$, $O^{2-}$, O atom and the like on the surface of platinum Pt to become $NO_2$ ($2NO+O_2 \rightarrow 2NO_2$). Next, the generated $NO_2$ is absorbed by kalium K as an absorption constituent to become in the form of nitrate salt, that is, nitrate kalium $KNO_3$, which is absorbed by K. So long as the oxygen density in the inflow exhaust gas is high, $NO_2$ is generated on the surface of platinum Pt and so long as the NOx absorption capability of K is not saturated, $NO_2$ is to be absorbed into K. In contrast, when the oxygen density in the inflow exhaust gas is reduced to reduce a generation amount of $NO_2$, the reaction advances in the reverse direction ($NO_3 \rightarrow NO_2$) and thus nitrate kalium $KNO_3$ in K is released in the form of $NO_2$ from an absorbent. That is, when the oxygen density in the inflow exhaust gas is reduced, NOx is to be released from K. As the degree of leanness in the exhaust gas is lowered, the oxygen density in the inflow exhaust gas is lowered. Accordingly, if the degree of leanness in the exhaust gas flow is lowered, NOx is to be released from K.

On the other hand, when an air-fuel ratio of the exhaust gas is enriched at this point, HC and CO in the exhaust gas reacts with oxygen $O_2^-$, $O^{2-}$ and the like on platinum Pt to be oxidized. In addition, when an air-fuel ratio of the inflow exhaust gas is made rich, since the oxygen density in the exhaust gas is extremely low, $NO_2$ is released from K. This $NO_2$, as shown in FIG. 3B, reacts with unburned HC and CO through platinum Pt to produce $N_2$ and $O_2$ as a result of reduction/purification. In this way, when $NO_2$ disappears on the surface of platinum Pt, $NO_2$ is continuously released form K. Accordingly, when an air-fuel ratio in the inflow exhaust gas is made rich, NOx is released from K in a short time to perform reduction/purification.

Here, as a reducer in use, a reducer may be used which generates a reduction constituent such as carbon hydrogen HC or carbon monoxide CO in the exhaust gas. That is, a gas such as hydrogen or carbon monoxide, carbon hydrogen of liquid or gas such as propane, propylene or butane and liquid fuel such as gasoline, light oil or kerosene may be used. In the present embodiment, light oil as fuel of a diesel engine is used as a reducer for avoiding complication at the time of storage or refuel. An example method of supplying light oil as a reducer to the NOx catalyst may include a method of injecting light oil from a reducer injection valve separately disposed in the exhaust passage 15 on the upstream side from the NOx catalyst or a method of injecting light oil to the combustion chamber 13 from the fuel injection valve 14 at a late period of an expansion stroke or during an exhaust stroke, that is, performing so-called post injection. It should be noted that supply of a reducer for the purpose of release/reduction of NOx in the NOx catalyst is called "rich spike".

Figure 4:
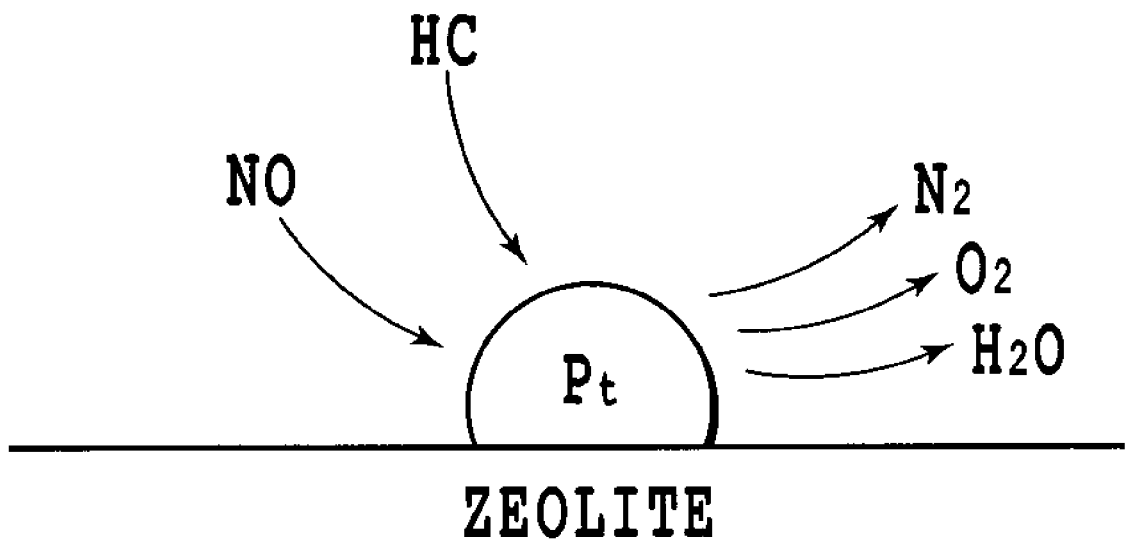
FIG. 4 is a schematic diagram showing a structure of a selective reduction type NOx catalyst.

Next, when using a selective reduction type NOx catalyst as the catalyst 38, as shown in FIG. 4, there is exemplified a structure that a noble metal such as platinum Pt is supported on a substrate surface made of zeolite, alumina or the like as the partition wall 37, a transition metal of Cu or the like is supported on the substrate surface by ion exchange or titanium/vanadium catalyst ($V_2O_5/WO_3/TiO_2$) or the like is supported on the substrate surface. In the selective reduction type NOx catalyst, on condition that an air-fuel ratio in the inflow exhaust gas is lean, HC and CO in the exhaust gas regularly and simultaneously react to produce $N_2$, $CO_2$, and $H_2O$ for purification. However, purification of NOx requires existence of HC. Even if an air-fuel ratio is lean, since unburned HC is necessarily contained in the exhaust gas, it is possible to perform reduction/purification of NOx by using this unburned HC. In addition, as in the case of the absorption reduction type NOx catalyst, the rich spike may be performed to supply a reducer. In this case, in addition to the reducers exemplified in the aforementioned, ammonia or urine may be used.

Figure 5:
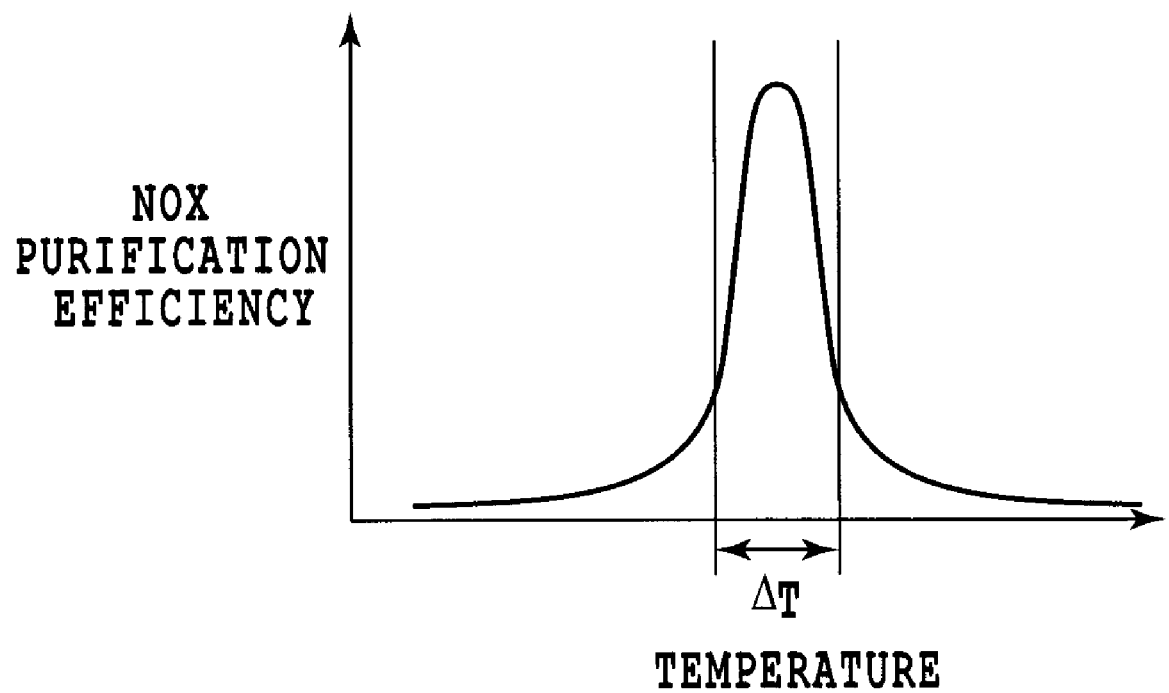
FIG. 5 is a graph showing a temperature window of a selective reduction type NOx catalyst.

As a negative of the selective reduction type NOx catalyst, there is a temperature window where the catalyst is active is relatively narrow. That is, FIG. 5 shows a relation between a temperature of an exhaust gas flown into the NOx catalyst or a catalyst floor temperature and NOx purification efficiency. As shown in FIG. 5, it has a defect that a high NOx purification efficiency is acquired only in a relatively narrow temperature range as $\Delta T$ and the NOx purification efficiency extremely deteriorates out of this temperature range. On the other hand, the absorption reduction type NOx catalyst has a wider temperature window than the selective reduction type NOx catalyst and is more advantageous than the selective reduction type NOx catalyst.

According to the present embodiment described above, however, when ozone is supplied from the ozone supplying nozzle 40, the catalyst 38 rises in temperature and is more activated by oxidation of PM on the upstream side passage of passages provided in such a manner as to sandwich the partition wall 37. Therefore, NOx purification by the NOx catalyst can be promoted. In consequence, even at a low temperature to the extent the NOx catalyst does not effectively function, it is prevented that NOx is emitted without being treated by the NOx catalyst.

Referring back to FIG. 1, the present embodiment is provided with means for detecting a collection amount or degrees of loading of PM in DPF 30. That is, exhaust pressure sensors 51 and 52 are disposed in the exhaust passage 15 on the upstream side and on the downstream side from DPF 30 for detecting an exhaust pressure at each side and these sensors 51 and 52 are connected to ECU 100 as control means. The ECU 100 determines a collection amount or degrees of loading of PM in DPF 30 based upon a deviation between an upstream-side exhaust pressure detected by the upstream-side exhaust sensor 51 and a downstream-side exhaust pressure detected by the downstream-side exhaust pressure sensor 52.

It should be noted that in the present embodiment, the upstream-side exhaust sensor 51 is arranged on the upstream side from the ozone supplying nozzle 40, but may be arranged on the downstream side from the ozone supplying nozzle 40.

In addition, in the present embodiment, a collection amount or degrees of loading of PM is detected by a pressure difference between the upstream side and the downstream side from DPF 30, but a collection amount or degrees of loading of PM may be detected only by one exhaust pressure sensor disposed on the upstream side from DPF 30. Further, degrees of loading of PM may be detected by determining time integration of a soot signal of a soot sensor disposed on the upstream side from the DPF. Likewise, a collection amount or degrees of PM can be determined by evaluating and timely integrating engine characteristic map data stored in ECU in relation to soot generation.

In addition, the present embodiment provides means for detecting a temperature of the exhaust gas flowing into DPF 30 or a DPF floor temperature. That is, a temperature sensor 53 is disposed at a position directly upstream of DPF 30 and ECU 100 calculates an exhaust gas temperature at a position directly upstream of DPF 30 based upon a detection signal of the temperature sensor 53. This temperature sensor 53 detects an exhaust gas temperature at a position between the ozone supplying nozzle 40 and DPF 30. It should be noted that a temperature detecting portion (in a case of a thermocouple, the tip end) of the temperature sensor 53 is preferably positioned in the neighborhood of a center of the upstream end surface of DPF 30. Since the temperature sensor 53 detects a floor temperature inside DPF 30, the temperature detecting portion may be buried in the interior of DPF 30.

In addition, the present embodiment provides means for detecting an air-fuel ratio in the exhaust gas flowing into DPF 30. That is, an air-fuel ratio sensor 54 is disposed upstream from DPF 30 and ECU 100 calculates an exhaust air-fuel ratio based upon a detection signal of this air-fuel ratio sensor 54. In the present embodiment, the air-fuel ratio sensor 54 detects an exhaust air-fuel ratio on the upstream side from the ozone supplying nozzle 40. These sensors 51, 52, 53 and 54 all are attached to the casing 31.

In the exhaust purifying system of the present embodiment, the ozone supplying nozzle 40, DPF 30 and the NOx catalyst are disposed in the exhaust passage 15 in that order from the upstream side. Therefore, the following effect is achieved. That is, when ozone is supplied from the ozone supplying nozzle 40, since the ozone is first introduced in the first passage 34 on the upstream side of the partition wall 37 in which PM is collected, the ozone does not contact the catalyst 38 supported only in the part of the partition wall 37 defining the passage on the downstream side of the exhaust gas in the partition wall 37. In consequence, it is prevented that the ozone is decomposed and consumed by the catalyst 38, enabling more ozone to be used for oxidation and removal of PM in DPF 30. This allows an efficient use of ozone and an improvement on a purification efficiency of PM by ozone. It should be noted that oxidizing and removing PM collected and deposited in DPF 30 means regeneration and an original performance of DPF 30 is to be achieved again by regeneration of this DPF 30.

Here, reaction and consumption of NOx and ozone will be in more detail explained. If ozone reacts with NOx in the exhaust gas, particularly NO, the reaction formula is represented by the following formulas.

$$NO + O_3 \rightarrow NO_2 + O_2 \tag{1}$$

$NO_2$ generated by this reaction further reacts with ozone as the following formula.

$$NO_2 + O_3 \rightarrow NO_3 + O_2 \tag{2}$$

Further, $NO_3$ generated by this reaction is further decomposed as follows:

$$2NO_3 \rightarrow 2NO_2 + O_2 \quad (3)$$

Here, according to the formula (1), the ozone is consumed for oxidation of NO. According to the formula (2), the ozone is consumed for oxidation of $NO_2$. According to the formula (3), $NO_2$ of the right side becomes $NO_2$ of the left side in the formula (2) and therefore, the ozone is consumed for oxidation of $NO_2$ of the left side in the formula (2).

In this way, NOx and the ozone repeatedly react in a cyclic way. Therefore, if the ozone is supplied at a position just before DPF 30 at all, when NOx is contained in the exhaust gas at that position, much ozone is consumed for oxidation and decomposition of NOx, leading to remarkable decrease of an amount of the ozone which is capable of being supplied to DPF 30. Since power is required for generating ozone at the ozone generator 43, such wasteful consumption of the ozone leads to wasteful consumption of power, finally possibly bringing about deterioration of fuel consumption.

Here, firstly it is preferable that supply timing of the ozone is a point where a collection amount (deposit amount) of PM in DPF 30 is more than a predetermined value. Therefore, ECU 100, when a deviation (Pu−P1) between an upstream-side exhaust pressure Pu detected by the upstream-side exhaust pressure sensor 51 and a downstream-side exhaust pressure P1 detected by the downstream-side exhaust pressure sensor 52 is more than a predetermined value, turns on the ozone generator 43 to perform supply of the ozone. On the other hand, ECU 100, when the deviation (Pu−P1) is less than the predetermined value, turns off the ozone generator 43 to stop the supply of the ozone.

Secondly, it is preferable that the supply timing of the ozone is a point where a temperature of an exhaust gas flowing into DPF 30 or a floor temperature of DPF 30 is within a proper temperature range, that is, a temperature where the ozone can be efficiently used. This temperature range is from 100 to 250° C. in the case of a diesel engine, for example. Therefore, ECU 100, when the temperature detected by the temperature sensor 53 is within such a temperature range, turns on the ozone generator 43 to perform the supply of the ozone. On the other hand, ECU 100, when the detected temperature is not within such a temperature range, turns off the ozone generator 43 to stop the supply of the ozone.

Thirdly, it is preferable that the supply timing of the ozone is a point where the exhaust gas flowing into DPF 30 does not contain an unnecessary constituent possibly causing reaction with the ozone. This unnecessary constituent is, for example, NOx as mentioned above, and although described in detail later, unburned HC also reacts with the ozone to produce wasteful consumption of the ozone. Whether or not such an unnecessary constituent is contained can be estimated based upon an exhaust air-fuel ratio detected by the air-fuel ratio sensor 54. Accordingly, ECU 100, when it is determined that the unnecessary constituent is contained based upon the detected exhaust air-fuel ratio, turns off the ozone generator 43 to stop the supply of the ozone. On the other hand, ECU 100, when it is determined that the unnecessary constituent is not contained, turns on the ozone generator 43 to perform the supply of the ozone.

These first to third conditions may be used in a combination as needed in an arbitrary combination, as well as depending on AND/OR condition. In the present embodiment, the ozone generator 43 turns on at the time of supplying ozone and immediately supplies the generated ozone, but the ozone may be in advance generated and stored to supply the stored ozone by switching a valve. In addition, ozone may be pressurized by a pump, compressor or the like for the supplying.

Here, another embodiment of the present invention will be explained. In the present embodiment, the catalyst 38 shown in FIG. 2 as described above is an ozone decomposition catalyst and a noble metal such as platinum Pt or palladium Pd may be supported on a carrier of a metallic oxide. It should be noted that only considering ozone decomposition capabilities, a manganese oxide may be used, but this has poor heat resistance and therefore, is not suitable for an engine for an automobile.

In the another embodiment, when ozone is supplied, even if there exists extra ozone which passes through the partition wall 37 without reaction with PM collected on the upstream side of the partition wall 37, since this ozone is decomposed by the catalyst 38 as an ozone decomposition catalyst, erosion of a metallic exhaust pipe or muffler disposed downstream of DPF 30 can be prevented. It should be noted that this ozone decomposition catalyst in the present embodiment may be used together with the NOx catalyst used in the embodiment described before, without mentioning.

Here, further, a different embodiment of the present invention will be explained. In the different embodiment, the catalyst 38 shown in FIG. 2 as described above is a CO oxidation catalyst and an example thereof may include, for example, a celia-zilconia compound oxide, an Ag/Ce—Zr compound oxide or an Ag/Ce—$ZrO_2$ compound oxide formed by supporting a noble metal such as silver Ag on a carrier of alumina $Al_2O_3$. Each catalyst is combined with ozone to show excellent CO oxidation activity.

In the different embodiment, when ozone is supplied, since the ozone does not immediately contact the CO oxidation catalyst supported only in the part of the partition wall 37 defining the passage on the downstream side of the exhaust gas in the partition wall 37. In consequence, it is prevented that the ozone is decomposed and consumed by the catalyst, enabling more ozone to be effectively used for oxidation and removal of PM collected in DPF 30. In addition, CO generated together with $CO_2$ due to oxidation of PM can be oxidized and removed by the CO oxidation catalyst even at a low temperature (for example, below 250° C.). It should be noted that this CO oxidation catalyst may be used together with the NOx catalyst and the ozone decomposition catalyst as mentioned above, without mentioning.

Next, experiment results with a simulation gas (model gas) made in relation to the aforementioned embodiments are shown as follows.

(I) In the Case where the Catalyst is a NOx Catalyst (1) EXPERIMENT DEVICE

Figure 6:
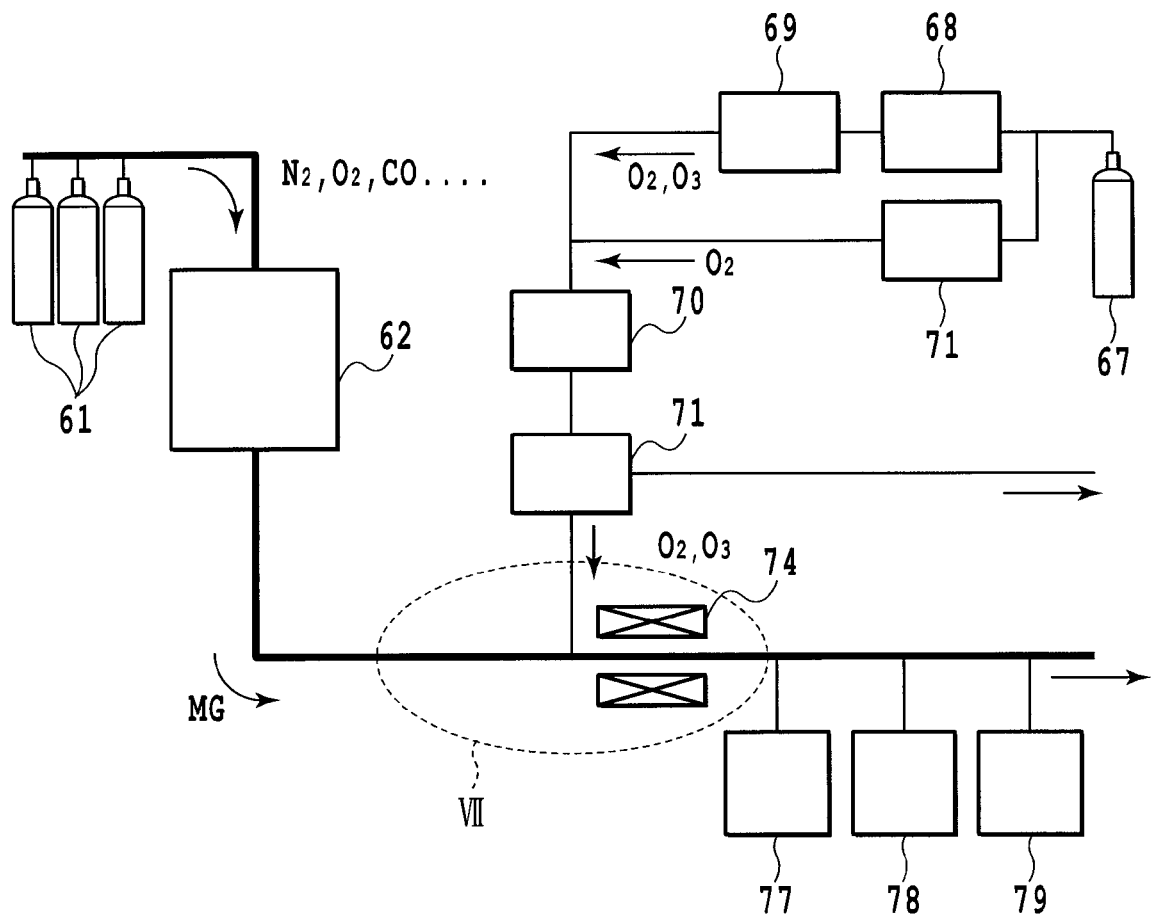
FIG. 6 is a diagram showing an entire experiment device for an experiment performed in relation to the embodiment.
Figure 7:
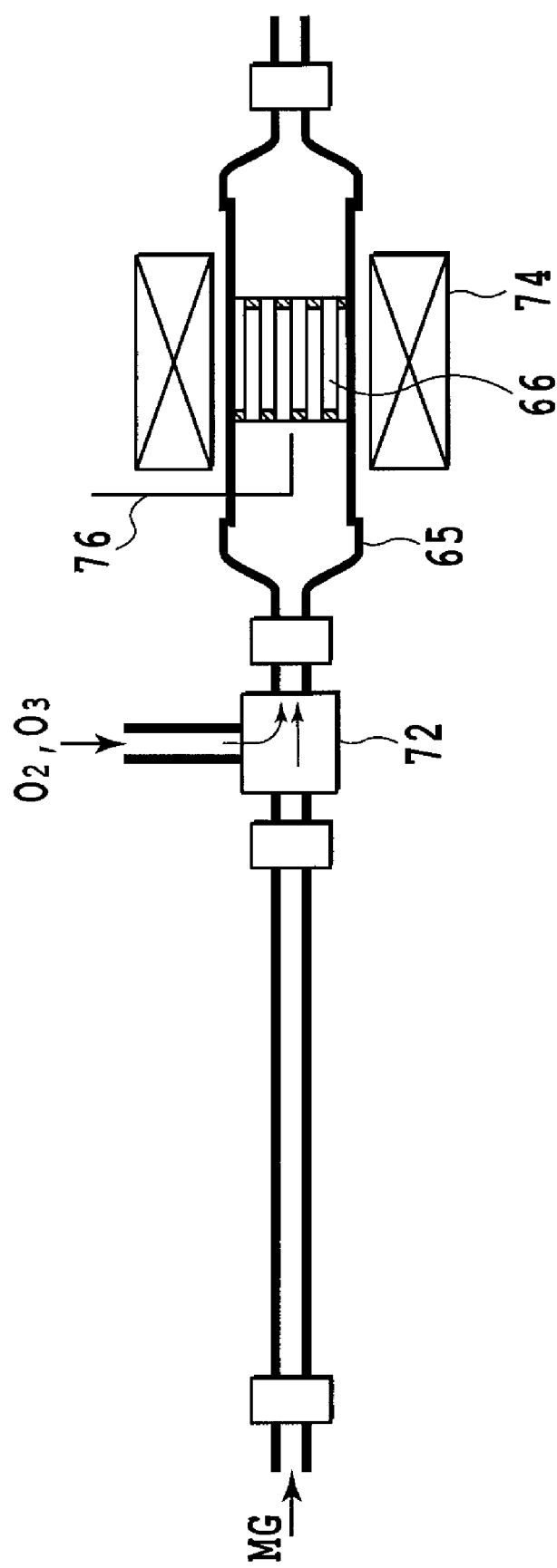
FIG. 7 is a cross section showing a detail of VII part in FIG. 6.

FIG. 6 shows an outline of the experiment device. FIG. 7 is a cross section showing a detail of VII part in FIG. 6.

Numeral 61 denotes a plurality of gas bottles. A raw material gas for producing a simulation gas for simulating an exhaust gas composition of a diesel engine is filled in each gas bottle. The raw material gas herein is a gas such as $N_2$, $O_2$ and CO. Numeral 62 denotes a simulation gas generator which is equipped with a mass flow controller to mix the respective raw material gases by a predetermined amount for generating a simulation gas MG. The simulation gas MG, as shown in detail in FIG. 7, passes through DPF 66 disposed inside the silica pipe 65 and is discharged from an exhaust duct (not shown) to an outside.

As shown in FIG. 6, gaseous oxygen $O_2$ supplied from an oxygen bottle 67 is bifurcated. One of the bifurcated gaseous oxygen is controlled in a flow amount by a flow amount control unit 68 and thereafter, is supplied to an ozone generator 69. In the ozone generator 69, the oxygen is selectively and partially made to ozone $O_3$, and the oxygen and the ozone (or only the oxygen) reach an ozone analyzer 70. In addition, in the other of the bifurcated gaseous oxygen, the oxygen is controlled in a flow amount by another flow amount control unit 71 and thereafter, is mixed with a gas supplied from the ozone generator 69, which reaches the ozone analyzer 70. In the ozone analyzer 70, the ozone density of the gas flown therein, that is, the ozone density of the supply gas supplied to DPF 66 is measured and thereafter, the supply gas is controlled in a flow amount by the flow amount control unit 71. The extra supply gas is discharged to an outside from the exhaust duct (not shown) and the supply gas of which a flow amount is controlled is mixed with the simulation gas MG at a three-way elbow 72 disposed upstream of the silica pipe 65 and thereafter, is supplied with the simulation gas MG to DPF 66.

An electrical heater 74 is disposed in the peripheral portion of the silica pipe 65 for controlling a temperature of DPF 66. In addition, a temperature sensor 76 for measuring a temperature at a position directly upstream of DPF 66 is disposed.

Downstream of DPF 66, an exhaust gas analyzer 77 for density measurement of HC, CO and NOx, an exhaust gas analyzer 78 for density measurement of $CO_2$ and an ozone analyzer 79 for density measurement of ozone are arranged in series in that order from the upstream side.

(2) EXPERIMENT CONDITION

The electrical heater 74 was controlled so that a temperature detected by the temperature sensor 76 is 250° C. The composition of the simulation gas MG is formed of NO of 210 ppm by volumetric density, $O_2$ of 5%, $H_2O$ of 3% and the balance of $N_2$. A flow amount of the simulation gas is 9.5 L/min and a supply pressure of the simulation gas is 0.4 MPa. The composition of the supply gas is formed of ozone of 20000 ppm and the balance of $O_2$. However, this is the composition in a case where the ozone generator 69 is turned on to perform ozone supply. In a case where the ozone generator 69 is turned off to stop the ozone supply, the supply gas is $O_2$ only. A flow amount of the supply gas is 0.5 L/min.

(3) EXPERIMENT METHOD $N_2$ continues to flow as the simulation gas MG until the temperature detected by the temperature sensor 76 reaches a constant value (250° C.). After the temperature becomes the constant value, NO and $O_2$ are added to the simulation gas and at the same time, oxygen is introduced into the ozone generator 69. When generating ozone, the oxygen is introduced and at the same time, the ozone generator 69 is turned on. An oxidation amount (oxidation speed) of PM in DPF 66 is calculated from CO density and $CO_2$ density detected by the exhaust gas analyzers 77 and 78. That is, by dividing a product of the simulation gas flow amount, the detected volume density and the measurement time by a volume of 1 mol (for example, 22.4 L), the mol number in the middle of the measuring is acquired and the oxidation amount (oxidation speed) of PM is calculated based upon this mol number. In addition, an absorption NOx amount is calculated from a time integral value of the NOx density detected by the exhaust gas analyzer 77.

(4) EXAMPLE AND COMPARATIVE EXAMPLE

Example 1

DPF 66 with specifications shown below was disposed and an oxidation speed of PM and a saturation NOx absorption amount were measured in a state where the ozone generator 69 was turned on.

A cordierite DPF having a diameter of 30 mm, a length of 50 mm, a cell wall thickness of 12 mil (milli inch length, 1/1000 inch) (0.3 mm) and a cell number of 300 cpsi (cells per square inch) (about 50 cells per one square cm) was used and $\gamma$-$Al_2O_3$ was coated on one surface thereof. The coat amount was 120 g/L (but, L of denominator means per catalyst of 1 L). Barium acetate was supported by water absorption on the coated surface of DPF, which was burned at a temperature of 500° C. for two hours. A supported amount of the barium acetate was 0.1 mol/L. This catalyst was dipped and treated in a solution containing ammonium hydrogen carbonate, which was dried at a temperature of 250° C. Further, Pt was supported on the cordierite by using a solution containing dinitrodiamine platinum. The DPF was dried and thereafter, was burned at a temperature of 450° C. for one hour. A supported amount of Pt was 2 g/L.

There was used DPF which was disposed in such a manner that a part of DPF on which the catalyst was coated was positioned on the downstream side in the gas flow direction, and PM was deposited on the DPF (PM was deposited on a surface on which the catalyst was not coated). It should be noted that deposit of PM was made in such a manner that a vessel which could arrange 12 pieces of cordierite honeycomb structures each having a diameter of 30 mm and a length of 50 mm in parallel was connected to an exhaust pipe of a diesel engine of 2000 cc and an exhaust gas in an operating condition of 2000 rpm and 30 Nm was flown into the vessel for one hour to collect PM. The honeycomb structure where PM was deposited was disposed inside the silica tube so that the surface on which PM was deposited was positioned on the upstream side in the gas flow direction and the side on which the catalyst was coated was positioned on the downstream side, and the experiment was thus carried out.

Comparative Example 1

A cordierite DPF having the same dimension specifications as DPF of Example 1 was used and $\gamma$-$Al_2O_3$ was coated on both surfaces thereof. The coat amount was 120 g/L (but, each surface had 60 g/L). Barium acetate was supported with water absorption on the coated surfaces of DPF, which was burned at a temperature of 500° C. for two hours. A supported amount of the barium acetate was 0.1 mol/L. This catalyst was dipped and treated in a solution containing ammonium hydrogen carbonate, which was dried at a temperature of 250° C. Further, Pt was supported thereon by using a solution containing dinitrodiamine platinum. The DPF was dried and thereafter, was burned at a temperature of 450° C. for one hour. A supported amount of Pt was 2 g/L.

After PM was deposited in this DPF, the DPF was disposed inside the silica pipe so that a surface on which the PM was deposited was positioned on the upstream side in the gas flow direction, and the experiment was thus carried out.

(5) EXPERIMENT RESULT

Figure 8:
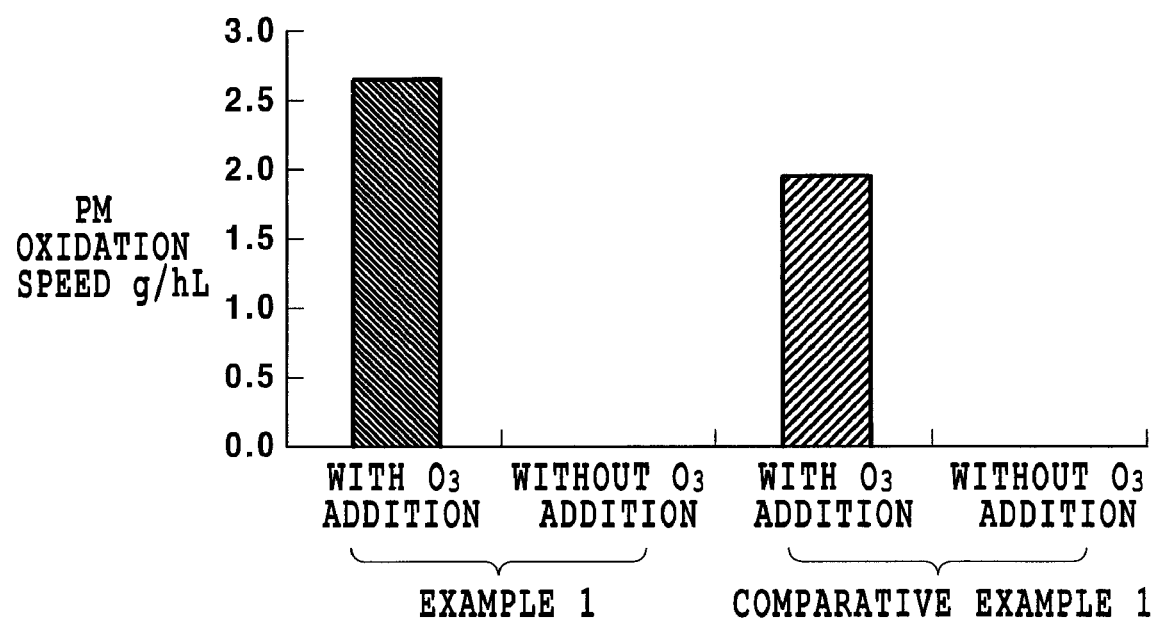
FIG. 8 is a graph showing an experiment result in relation to a PM oxidation speed in a case of using a NOx catalyst as a catalyst.
Figure 9:
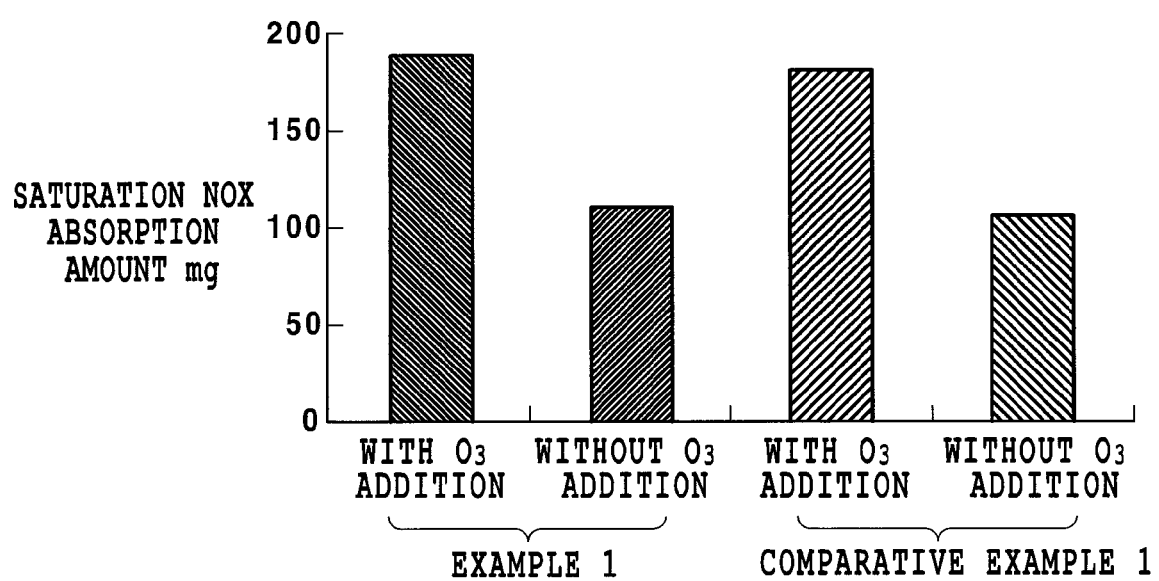
FIG. 9 is a graph showing an experiment result in relation to a saturation NOx absorption amount in a case of using a NOx catalyst as a catalyst.

FIG. 8 shows a comparison in a PM oxidation speed and FIG. 9 shows a comparison in a saturation NOx absorption amount, for five minutes after switching the simulation gas composition from $N_2$ (after introducing $O_2$ into the ozone generator). A unit g/hL of a PM oxidation speed of an ordinate in FIG. 8 shows a gram number of PM oxidized per DPF of 1 L and per one hour. As seen from FIG. 8, in the case where the ozone was not added in both of Example 1 and Comparative Example 1, oxidation of PM could not be confirmed, but in the case where the ozone was added in both of Example 1 and Comparative Example 1, a PM oxidation speed in Example 1 was higher than that in Comparative Example 1. In addition, a unit of the saturation NOx absorption amount in an ordinate in FIG. 9 is milligram. As seen from FIG. 9, in the case where the ozone was added or not added, the saturation NOx absorption amount in Example 1 was larger than that in Comparative Example 1.

(II) In the Case where the Catalyst is an Ozone Decomposition Catalyst (1) EXPERIMENT DEVICE It is the same as in the case of (I) shown in FIG. 6.

(2) EXPERIMENT CONDITION

The experiment condition is the same as that described in (2) of (I) above except for the following condition. In the present embodiment, the electrical heater 74 is controlled such that a temperature detected by the temperature sensor 76 is 100° C. In this way, a target temperature is lower than the target temperature of 250° C. in the previous embodiment, but this is because of examining an effect due to ozone supply at a low temperature to the extent the catalyst does not sufficiently function.

(3) EXPERIMENT METHOD

It is substantially the same as the experiment method described in (3) of (I) of the embodiment. That is, $N_2$ continues to flow as the simulation gas MG until a temperature detected by the temperature sensor 76 reaches a constant value (100° C.). After the temperature becomes the constant value, $H_2O$ and $O_2$ are added to the simulation gas and at the same time, oxygen is introduced into the ozone generator 69, which is then turned on. An oxidation amount (oxidation speed) of PM in DPF 66 is calculated from CO density and $CO_2$ density detected by the exhaust gas analyzers 77 and 78. That is, by dividing a product of the simulation gas flow amount, the detected volume density and the measurement time by a volume of 1 mol (for example, 22.4 L), the mol number in the middle of the measuring is acquired and the oxidation amount (oxidation speed) of PM is calculated based upon this mol number. In addition, a decomposition efficiency of the ozone is calculated from the density of the ozone detected by the ozone analyzer 79. It should be noted that in this experiment, for clarifying an effect due to decomposition of the ozone by the catalyst, the experiment was carefully carried out so that in the simulation gas MG, there did not exist a gas which might possibly react with the ozone.

(4) EXAMPLE AND COMPARATIVE EXAMPLE

Example 2

A cordierite DPF having a diameter of 30 mm, a length of 50 mm, a cell wall thickness of 12 mil (milli inch length, 1/1000 inch) (0.3 mm) and a cell number of 300 cpsi (cells per square inch) (about 50 cells per one square cm) was used and a Ce—Zr compound oxide was coated on one surface thereof. The coat amount was 120 g/L (however, L of denominator means per catalyst of 1 L). Further, palladium Pd was supported on the coated surface by using a solution containing palladium nitrate. The catalyst was dried and thereafter, was burned at a temperature of 450° C. for one hour. A supported amount of palladium Pd was 3 g/L.

There was used DPF which was disposed in such a manner that a part of DPF on which the catalyst was coated was positioned on the downstream side in the gas flow direction, and PM was deposited on the DPF (PM was deposited on a surface on which the catalyst was not coated). It should be noted that deposit of PM, as in the case of the previous embodiment, was made in such a manner that a vessel which could arrange 12 pieces of cordierite honeycomb structures each having a diameter of 30 mm and a length of 50 mm in parallel was connected to an exhaust pipe of a diesel engine of 2000 cc and an exhaust gas in an operating condition of 2000 rpm and 30 Nm was flown into the vessel for one hour to collect PM. The honeycomb structure where PM was deposited was disposed inside the silica tube so that the surface on which PM was deposited was positioned on the upstream side in the gas flow direction and the part on which the catalyst was coated was positioned on the downstream side, and the experiment was carried out.

Comparative Example 2

A cordierite DPF having the same dimension specifications as DPF of Example 2 was used and a Ce—Zr compound oxide was coated on both surfaces thereof. A coat amount was 120 g/L (but, each surface had 60 g/L). As in the case of Example 2, palladium Pd was supported on the coated surface by using a solution containing palladium nitrate. The catalyst was dried and thereafter, was burned at a temperature of 450° C. for one hour. A supported amount of palladium Pd was 3 g/L. In addition, after depositing PM on the DPF similarly, the DPF was disposed inside the silica tube so that the surface on which PM was deposited was positioned on the upstream side in the gas flow direction, and the experiment was carried out.

Comparative Example 3

A cordierite DPF itself having the same dimension specifications as DPF of Examples 1 and 2 was used, i.e., without catalyst coating. In addition, after similarly depositing PM on the DPF without catalyst coating, the DPF was disposed inside the silica tube so that the surface on which PM was deposited was positioned on the upstream side in the gas flow direction, and the experiment was carried out.

Comparative Example 4

Figure 10:
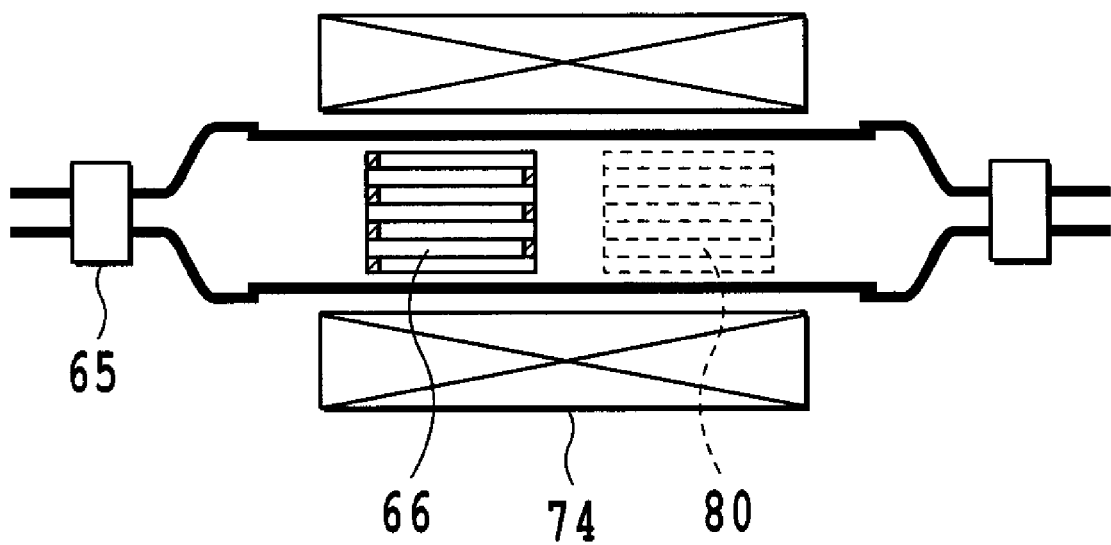
FIG. 10 is a cross section showing another disposition example in a silica tube of VII part in FIG. 6.

There was used a DPF where PM was deposited on the DPF without catalyst coating used in the above Comparative Example 3. Further, there was used a DPF of an ozone decomposition catalyst where a Ce—Zr compound oxide was coated on both surfaces of the cordierite honeycomb structure DPF having a diameter of 30 mm, a length of 25 mm, a cell wall thickness of 4 mil (0.1 mm) and a cell number of 400 cpsi (about 75 cells per one square cm) (a coated amount was 120 g/L (however, each surface had 60 g/L)) and further, palladium Pd was supported on the coated surface by using a solution containing palladium nitrate. Then, the catalyst was dried and thereafter, was burned at a temperature of 450° C. for one hour (a supported amount of palladium Pd was 3 g/L). In addition, as shown in FIG. 10, these DPFs were disposed inside the silica tube so that the DPF without catalyst coating was positioned on the upstream side and the surface thereof on which PM was deposited was positioned on the upstream side in the gas flow direction and also the DPF of the ozone decomposition catalyst (shown by numeral 80 in FIG. 10) was positioned on the downstream side, and the experiment was carried out.

(5) EXPERIMENT RESULT

Figure 11:
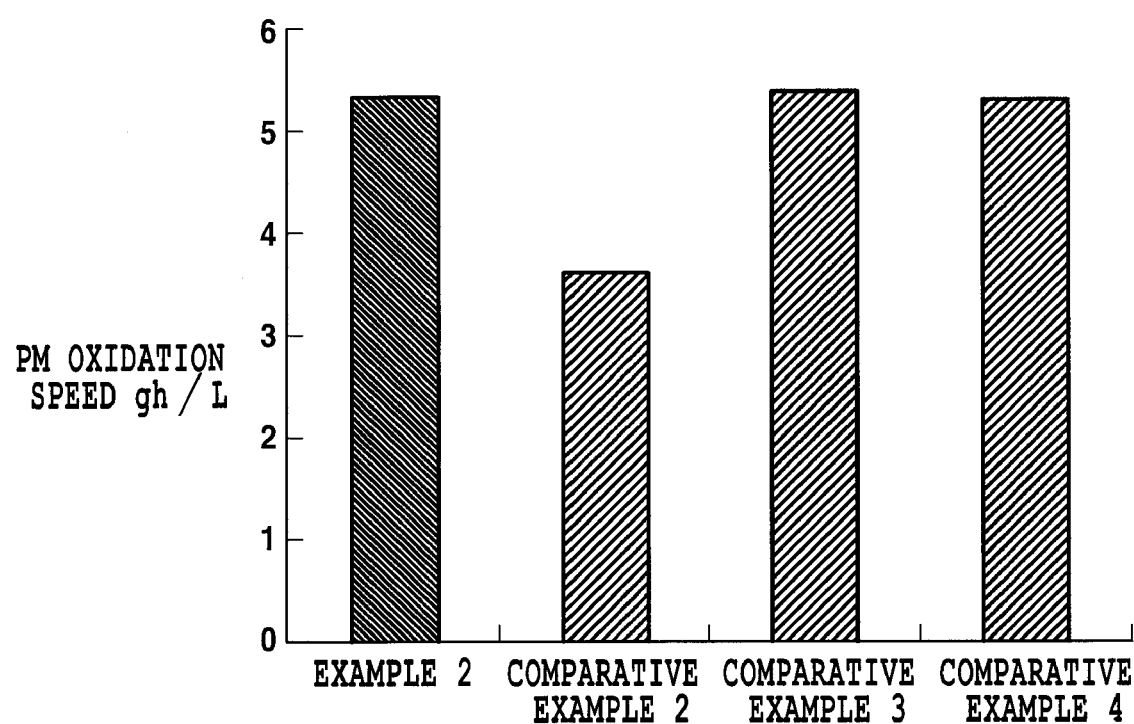
FIG. 11 is a graph showing an experiment result in relation to a PM oxidation speed in a case of using an ozone decomposition catalyst as a catalyst.
Figure 12:
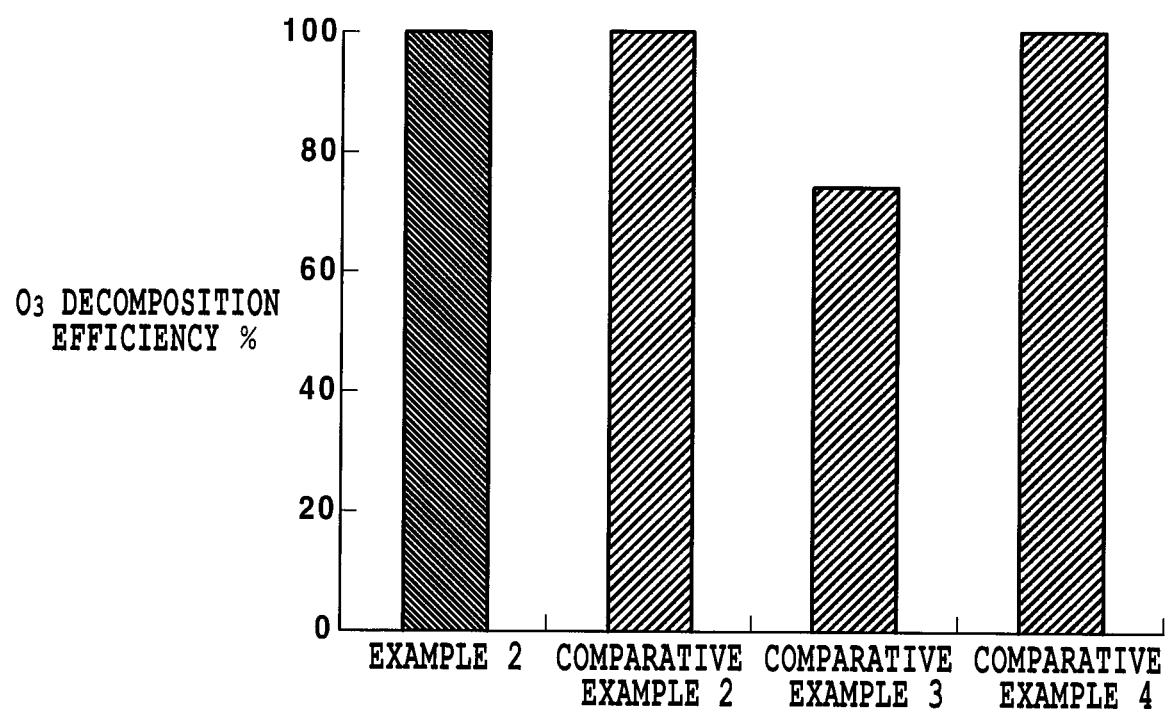
FIG. 12 is a graph showing an experiment result in relation to an ozone decomposition efficiency in a case of using an ozone decomposition catalyst as a catalyst.

FIG. 11 shows a comparison in a PM oxidation speed for five minutes after switching the simulation gas composition from $N_2$ (after introducing $O_2$ into the ozone generator). FIG. 12 also shows a decomposition efficiency of ozone. As seen from FIGS. 11 and 12, Example 2 shows a highly excellent effect in both of a PM oxidation speed and a decomposition efficiency of ozone. Example 2 and Comparative Example 2 have the same effect in the ozone decomposition efficiency, but in terms of the PM oxidation speed, Comparative Example 2 has no advantage over Example 2. This is because ozone is consumed by contact between ozone and catalyst.

In addition, Example 2 and Comparative Example 3 have the same effect in the PM oxidation speed, but in terms of the ozone decomposition efficiency, Comparative Example 3 has no advantage over Example 2. This means that the PM oxidation speed depends only on the ozone and from this, an effect of an ozone addition is seen.

In addition, Example 2 and Comparative Example 4 both show the same effect in the PM oxidation speed and the decomposition efficiency of the ozone, but, considering that Example 2 is a one-piece catalytic DPF, that is, the volume or the capacity of Example 2 requires only the order of half of that of Comparative Example 4, the Example 2 is superior to Comparative Example 4.

(III) In the Case where the Catalyst is a Co Oxidation Catalyst (1) EXPERIMENT DEVICE It is the same as in the case of (I) shown in FIG. 6.

(2) EXPERIMENT CONDITION

The experiment condition is the same as that described in (2) of (I) above except for the following condition. In the present embodiment, the electrical heater 74 is controlled so that a temperature detected by the temperature sensor 76 is 100° C. In this way, the target temperature is lower than the target temperature of 250° C. in the case of the ozone decomposition catalyst in the previous embodiment, but this is because of examining an effect due to ozone supply at a low temperature to the extent the catalyst does not sufficiently function.

(3) EXPERIMENT METHOD

It is substantially the same as the experiment method described in (3) of (I) of the embodiment. That is, $N_2$ continues to flow as the simulation gas MG until the temperature detected by the temperature sensor 76 reaches a constant value (100° C.). After the temperature becomes the constant value, $H_2O$ and $O_2$ are added to the simulation gas and at the same time, oxygen is introduced into the ozone generator 69, which is then turned on. In addition, a purification efficiency of CO was calculated based upon an integral value of CO discharge amounts measured by the analyzer 77 with or without a CO oxidation catalyst. That is, the purification efficiency is shown in the following formula.

CO purification efficiency(%)=(integral value of CO discharge amount without CO oxidation catalyst)/(integral value of CO discharge amount with CO oxidation catalyst)×100

(4) EXAMPLE AND COMPARATIVE EXAMPLE

Example 3

A cordierite DPF having a diameter of 30 mm, a length of 50 mm, a cell wall thickness of 12 mil (milli inch length, 1/1000 inch) (0.3 mm) and a cell number of 300 cpsi (cells per square inch) (about 50 cells per one square cm) was used and a Ce—Zr compound oxide was coated on one surface thereof. A coated amount was 120 g/L (however, L of denominator means per catalyst of 1 L). Further, silver Ag was supported on the coated surface by using a solution containing silver nitrate. The catalyst was dried and thereafter, was burned at a temperature of 450° C. for one hour. A supported amount of silver Ag was 3 g/L.

There was used a DPF which was disposed in such a manner that a part of the DPF on which the catalyst was coated was positioned on the downstream side in the gas flow direction, and PM was deposited on the DPF (PM was deposited on a surface on which the catalyst was not coated). It should be noted that deposit of PM, as in the case of the previous embodiment, was made in such a manner that a vessel which could arrange 12 pieces of cordierite honeycomb structures each having a diameter of 30 mm and a length of 50 mm in parallel was connected to an exhaust pipe of a diesel engine of 2000 cc and an exhaust gas in an operating condition of 2000 rpm and 30 Nm was flown into the vessel for one hour to collect PM. The honeycomb structure where the PM was deposited was disposed inside the silica tube so that the surface on which PM was deposited was positioned on the upstream side in the gas flow direction and the part on which the catalyst was coated was positioned on the downstream side, and the experiment was thus carried out.

Example 2

A cordierite DPF having the same dimension specifications as a DPF of Example 3 was used and a Ce—Zr compound oxide was coated on one surface thereof. A coated amount was 120 g/L. Palladium Pd was supported on the coated surface by using a solution containing palladium nitrate. The catalyst was dried and thereafter, was burned at a temperature of 450° C. for one hour. A supported amount of palladium Pd was 3 g/L. In addition, after depositing PM on the DPF similarly, the DPF was disposed inside the silica tube so that a surface on which PM was deposited was positioned on the upstream side in the gas flow direction, and the experiment was thus carried out in the same way as in Example 3.

(5) EXPERIMENT RESULT

Figure 13:
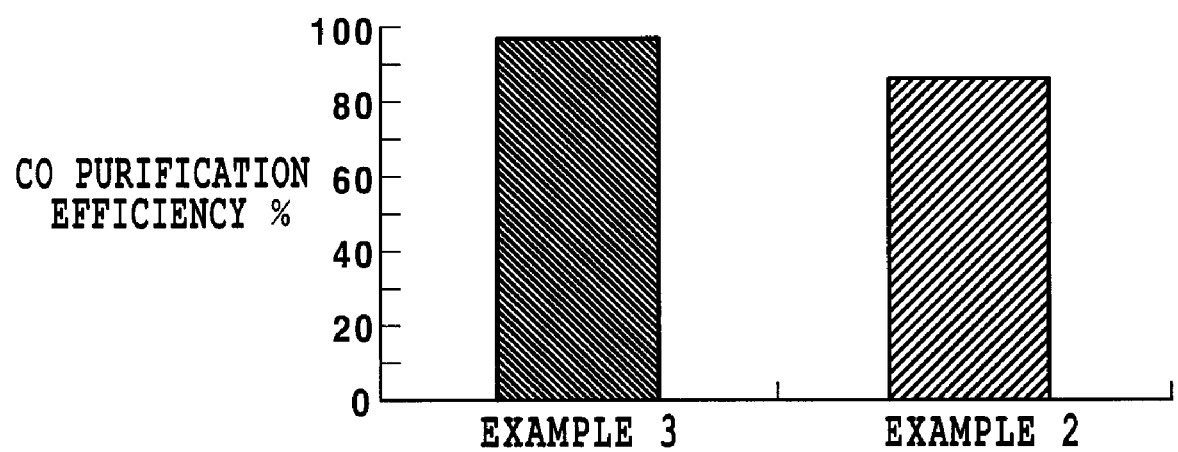
FIG. 13 is a graph showing an experiment result in relation to a CO purification efficiency in a case of using a CO oxidation catalyst as a catalyst.

FIG. 13 shows a comparison in a CO purification efficiency for five minutes after switching the simulation gas composition from $N_2$ (after introducing $O_2$ into the ozone generator). As seen from FIG. 13, Example 3 shows a highly excellent CO purification efficiency as compared to that of Example 2.

(6) ADDITIONAL EXPERIMENT

Further, in order to confirm that the CO oxidation catalyst in Example 3 using an Ag/Ce—Zr compound oxide, when used in combination with ozone, shows an excellent CO oxidation activity, the following experiment was carried out using DPFs with the CO oxidation catalyst in Example 3 and Example 2 having no deposit of PM. In addition, as Comparative Example 5, an experiment of oxidizing CO with ozone was also carried out without using a CO oxidation catalyst, but using a cordierite DPF itself, which has the same dimension specifications as the DPFs of Example 3 and Example 2.

The experiment condition is the same as the condition mentioned in (2) of (III) above except that the simulation gas MG composition changes from NO to CO. That is, also in the present experiment, the electrical heater 74 is controlled so that a temperature detected by the temperature sensor 76 is 100° C. The composition of the simulation gas MG is formed of CO of 1000 ppm by volumetric density, $O_2$ of 5%, $H_2O$ of 3% and the balance of $N_2$. A flow amount of the simulation gas is 9.5 L/min and a supply pressure of the simulation gas is 0.4 MPa. The composition of the supply gas is formed of ozone of 20000 ppm and the balance of $O_2$. However, this is the composition in a case where the ozone generator 69 is turned on to perform ozone supply. In a case where the ozone generator 69 is turned off to stop the ozone supply, the supply gas is $O_2$ only. A flow amount of the supply gas is 0.5 L/min.

In addition, the experiment method is substantially the same as the experiment method described in (3) of (III) above. That is, $N_2$ continues to flow as the simulation gas MG until the temperature detected by the temperature sensor 76 reaches a constant value (100° C.). After the temperature becomes the constant value, $H_2O$ and $O_2$ are added to the simulation gas and at the same time, oxygen is introduced into the ozone generator 69. When adding the ozone, the ozone generator 69 is turned on in synchronization with the oxygen introduction. In addition, a purification efficiency of CO was calculated based upon a CO density measured by the analyzer 77. That is, the purification efficiency is shown in the following formula.

CO purification efficiency(%)=(CO density in the inflow gas)/(CO density in the outflow gas)×100

Figure 14:
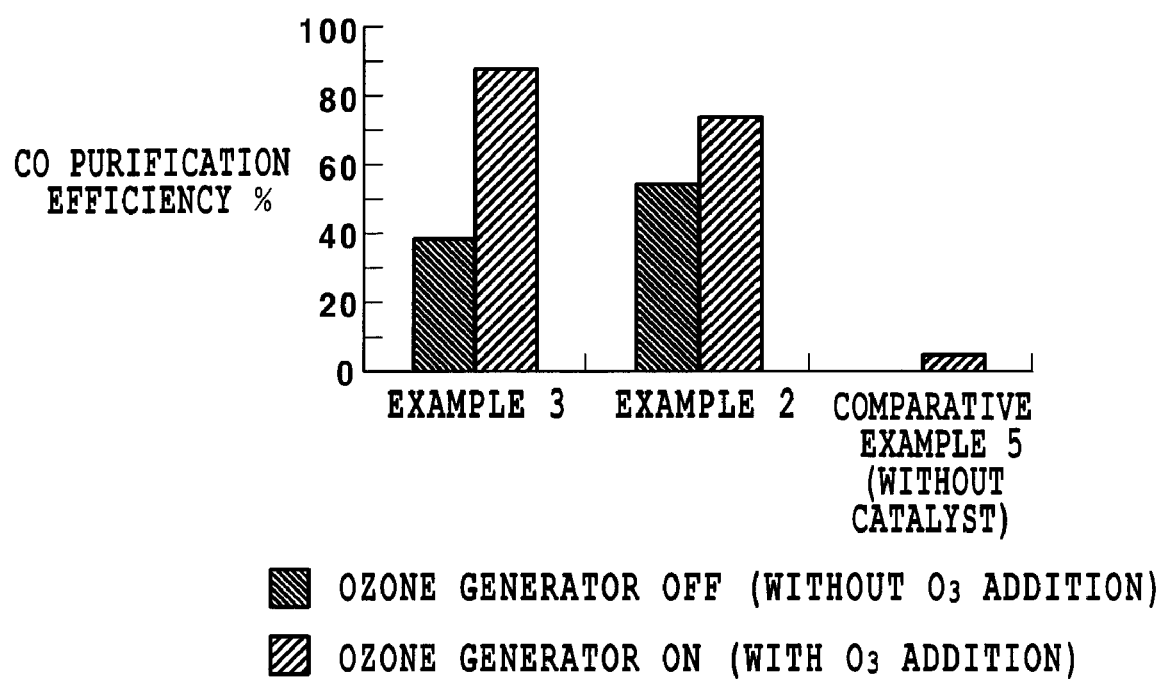
FIG. 14 is a graph showing an experiment result in relation to a CO purification efficiency in a case of using a CO oxidation catalyst as a catalyst with addition of ozone or without addition of ozone.

FIG. 14 shows experiment results in the cases of adding ozone and not adding ozone. As seen from FIG. 14, in the case of Comparative Example 5 not using a CO oxidation catalyst, even if the ozone is added for oxidation of CO, a purification effect of CO can not be acquired at a low temperature of 100° C. Therefore, it can be said that a catalyst is necessary. In addition, the CO oxidation catalyst of Example 3 using an Ag/Ce—Zr compound oxide shows a higher CO purification efficiency with adding ozone, as compared to that of Example 2. It is appreciated that it shows an excellent activity even at a low temperature of 100° C. at the time of use with the ozone.

INDUSTRIAL APPLICABILITY

As described above, the embodiments of the present invention are explained, but the present invention can adopt a different embodiment. For example, the present invention, besides a diesel engine as a compression ignition type internal combustion engine, may be applied to all internal combustion engines which possibly generate PM. For example, the present invention may be applied to a direct-injection spark ignition internal combustion engine, in particular, a direct-injection lean burning gasoline engine. In this engine, fuel is directly injected into an in-cylinder combustion chamber, but there is the possibility that in a high load region having a large number of fuel injection, fuel does not completely burn to generate PM. Even if the present invention is applied to such an engine, the advantage similar to the aforementioned can be sufficiently expected.

The invention claimed is:

1. An exhaust purifying system for an internal combustion engine comprising:
    a wall-flow type particulate filter for collecting particulate matter in an exhaust gas inside an exhaust passage, and
    ozone supplying means, disposed on the upstream side from the particulate filter, for supplying ozone, wherein:
    a catalyst is supported only in a part of a partition wall of the particulate filter defining a passage on the downstream side of the partition wall.

2. An exhaust purifying system for an internal combustion engine according to claim 1, wherein:
    the catalyst is a NOx catalyst for purifying NOx in the exhaust gas.

3. An exhaust purifying system for an internal combustion engine according to claim 1, wherein:
    the catalyst is an ozone decomposition catalyst for decomposing ozone.

4. An exhaust purifying system for an internal combustion engine according to claim 1, wherein:
    the catalyst is a CO oxidation catalyst for purifying CO in the exhaust gas.

5. An exhaust purifying system for an internal combustion engine according to claim 4, wherein:
    said CO oxidation catalyst is an Ag/Ce—Zr compound oxide.

6. An exhaust purifying system for an internal combustion engine according to claim 1, wherein:
    ozone is supplied from said ozone supplying means when a collection amount of particulate matter in said particulate filter is more than a predetermined value.

7. An exhaust purifying system for an internal combustion engine according to claim 6, wherein:
    supplying ozone from said ozone supplying means is performed when a deviation between an upstream-side exhaust pressure and a downstream-side exhaust pressure of said particulate filter is more than a predetermined value, and supplying ozone from said ozone supplying means is stopped when the deviation is less than the predetermined value.

8. An exhaust purifying system for an internal combustion engine according to claim 1, wherein:
    supplying ozone from said ozone supplying means is performed when a temperature of said particulate filter or an exhaust gas is within a range from 100 to 250° C.

9. An exhaust purifying system for an internal combustion engine according to claim 1, wherein:
    supplying ozone from said ozone supplying means is stopped when an unnecessary constituent possibly causing reaction with ozone is contained in an exhaust gas flowing into said particulate filter.

* * * * *